(12) United States Patent
Roth

(10) Patent No.: US 6,619,805 B1
(45) Date of Patent: Sep. 16, 2003

(54) LATENT HEAT ACTUATED NON-FOGGING SHOWER MIRROR

(76) Inventor: Paul F. Roth, 720 Helene Ave., Royal Oak, MI (US) 48067

( * ) Notice: Subject to any disclaimer, the term of this patent is extended or adjusted under 35 U.S.C. 154(b) by 0 days.

(21) Appl. No.: 08/999,999

(22) Filed: Dec. 10, 1997

Related U.S. Application Data

(63) Continuation-in-part of application No. 08/619,408, filed on Mar. 21, 1996, now abandoned.

(51) Int. Cl.[7] .............................. G02B 5/08; G02B 7/182
(52) U.S. Cl. ...................... 359/507; 359/509; 359/512; 359/872; 359/900; 248/467; 248/479; 132/291; 132/316; 4/597; 4/605; D6/300
(58) Field of Search .................. 359/507, 509, 359/512, 870, 871, 872, 900; 248/467, 479; 4/597, 605; 132/291, 301, 302, 316; D6/300, 301, 302, 309

(56) References Cited

U.S. PATENT DOCUMENTS

| | | | |
|---|---|---|---|
| 4,072,397 A | * | 2/1978 | Ross |
| 4,529,278 A | * | 7/1985 | Nugent ........................ 248/467 |
| 4,655,559 A | * | 4/1987 | Odell .......................... 248/467 |
| 4,832,475 A | * | 5/1989 | Daniels ....................... 248/467 |
| 4,848,542 A | * | 7/1989 | Burnette et al. ................ 4/605 |
| 4,906,084 A | * | 3/1990 | Christianson |
| 4,950,065 A | * | 8/1990 | Wyman ....................... 248/467 |
| 5,093,748 A | * | 3/1992 | Higdon ........................ 248/467 |
| D343,737 S | * | 2/1994 | Huttner ........................ D6/300 |
| 5,402,265 A | * | 3/1995 | Jahoda et al. ................ 359/512 |
| D358,715 S | * | 5/1995 | Young .......................... D6/300 |
| 5,604,633 A | * | 2/1997 | Christianson ................ 359/507 |
| 5,623,955 A | * | 4/1997 | Sewell ........................ 132/291 |

* cited by examiner

Primary Examiner—Ricky D. Shafer

(57) ABSTRACT

A condensation free mirror to be used in a shower environment consisting of a mirror substrate and a means for detachably mounting the mirror to a shower wall. The mirror assembly is designed for optimum heat retention in order to provide a condensation free surface after being exposed to the warm shower stream. No internal plumbing, reservoirs, or anti-fog coatings are required to achieve a condensation free surface.

13 Claims, 1 Drawing Sheet

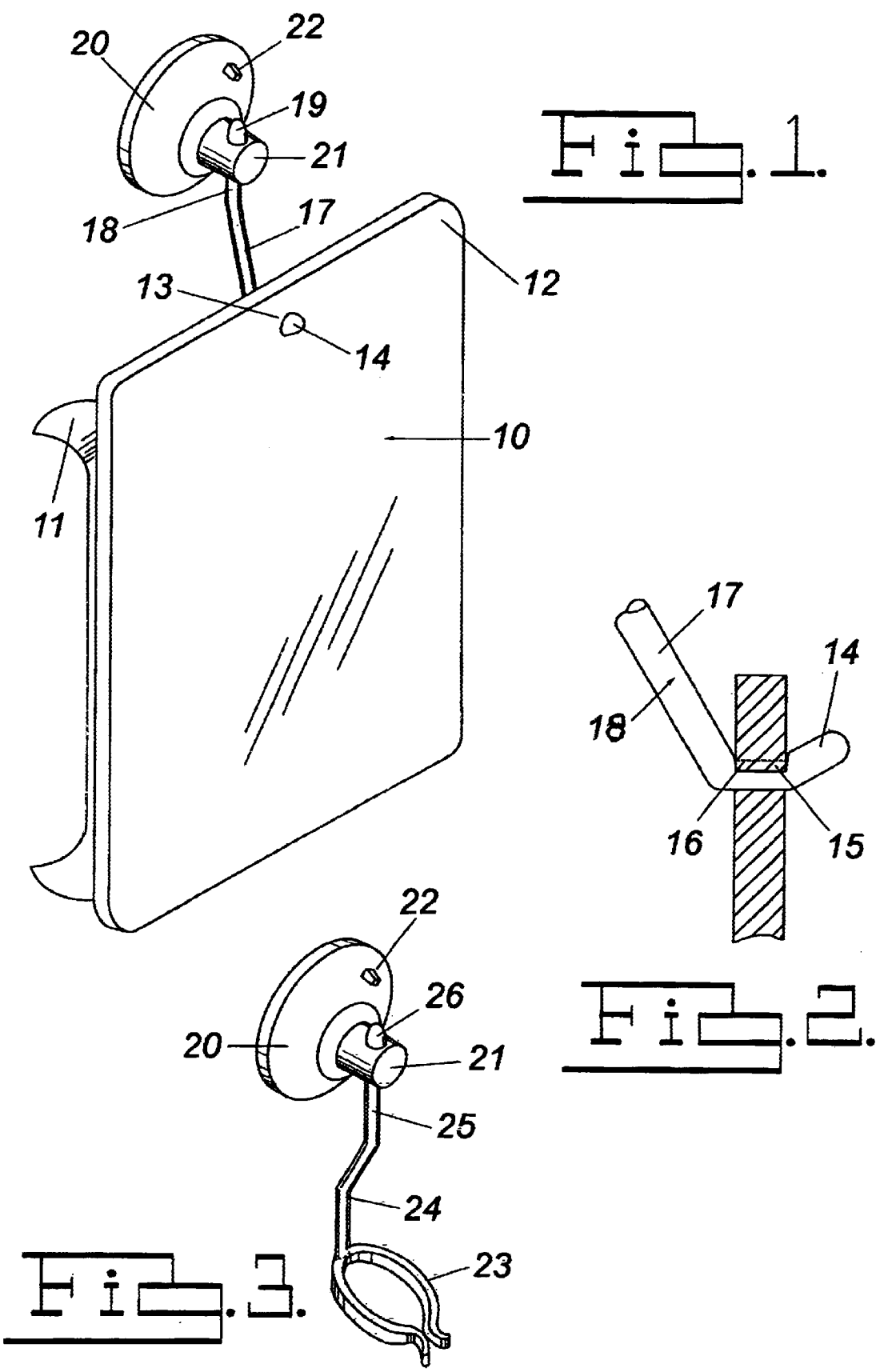

LATENT HEAT ACTUATED NON-FOGGING SHOWER MIRROR

The present application is a continuation-in-part of U.S. patent application Ser. No. 08/619,408, filed on Mar. 21, 1996, which is now abandoned.

BACKGROUND

1. Field of Invention

This invention relates generally to mirrors, specifically to an ultra light weight, portable, shatterproof, latent heat actuated, condensation-free mirror for use in a bathroom, shower or other steamy environment.

2. Description of Prior Art

Many men prefer to shave in the shower due to the fact that a closer, more comfortable, shave can be attained. Facial hair can be removed much more easily because the beard and skin are softened by the warmth and humidity of the shower environment. The potential for irritating the skin is greatly reduced by shaving in the shower shaving cream or gel can also be rinsed from the face more thoroughly. Additionally, Many men appreciate the convenience of shaving in the shower due to the fact that it is more comfortable and takes less time. Shaving in the shower also alleviates the common problems of waiting for warm water at the bathroom sink and cleaning the sink after shaving. Many women also appreciate the fact that the sink does not require cleaning as frequently. Razors stay sharp longer when used on facial hair which has been softened by the shower and the frequency of purchasing high cost replacement blades for razors is reduced. Many women chose to remove makeup, apply skin treatments, or pluck eyebrows in the warm, humid environment of the shower.

A typical mirror will not facilitate these desires due to the build up of condensation which occurs on the surface of the mirror in the shower environment. There are also significant safety concerns associated with utilizing a non-shatterproof mirror in the shower. In response to consumer need, shower safe, fog free shower mirrors have been developed and successfully marketed in the United States and overseas for more than ten years. There are several existing technologies and related patents which have here to fore been utilized to create a fog free mirrored surface for use in the shower.

The existing technologies which have been designed to achieve a fog resistant surface for use in the bathroom or shower can be grouped in to three distinct classes. The classes consist of; mirrors which are coated with a fog resistant organic material, mirrors which are heated via conduction from the rear by the shower stream or circulating hot water, and mirrors heated via conduction from the rear by stationary warm water reservoirs. Each of these technologies is somewhat expensive and has significant drawbacks which are overcome by the product described in this patent application.

There are many commercially available mirrors which are treated with an organic based fog resistant coatings. The Fog-Free Mirror Device in U.S. Pat. No. 5,402,265 issued to Jahoda, Mar. 28, 1995 describes a flexible fog free mirror which utilizes a type of fog-resistant coating. The primary problem with fog resistant coatings is that it is that they are temporary in nature and wear off after a period of time, resulting in a non fog resistant mirror. A secondary, but significant, problem with the coatings is that they attract dust and soap residue therefore requiring frequent cleaning. Frequent cleaning acts very quickly to remove the condensation resistant coatings. The condensation resistant coatings tend to cause water to stream down the surface of the mirror in channels, distorting the image seen in the mirror. Fog resistant coatings also add cost to the product and reduce the overall clarity of the mirror.

There have been many patents issued for fog resistant mirrors that are heated via conduction from the rear by warm water. These systems redirect, or are placed in front of, the warm shower stream to heat the back side of mirror assembly and require heat energy to be transmitted to the front side of the mirror in an effort to deter fogging.

(Water Heated Mirror U.S. Pat. No. 3,594,063 to Smillie Jul. 20, 1971)

(Water Heated Mirror for Condensation Control U.S. Pat. No. 3,708,218 to Smillie Jan. 2, 1973)

(Condensation-Free Shower Mirror U.S. Pat. No. 4,836,668 to Christianson Jun. 6, 1989)

(No-Fog Magnifying Shower Mirror U.S. Pat. No. 4,904,072 to Christianson Feb. 27, 1990)

(Condensation-Free Shower Mirror U.S. Pat. No. 4,993,821 to Christianson Feb. 2, 1991)

(Condensation-Free Shower Mirror U.S. Pat. No. 5,032,015 to Christianson Jul. 16, 1991)

(Condensation-Free Shower Mirror U.S. Pat. No. 5,604,633 to Christianson Feb. 18, 1997)

The mirrors described in these patents utilize piping, valves, or support mechanisms which make the systems very expensive to manufacture. This type of mirror is also fairly large and not convenient for traveling. Most of these mirrors are cumbersome to install because they must be incorporated into the existing shower plumbing system. This causes a significant lack of portability which presents a significant draw back. Water circulating rear heated mirrors often take significant time to clear, or do not clear completely. Water flow on the back side of the mirror surface tends to form channels and only partially heat the back side of the mirror, which can result in only localized areas which are free of condensation. A high volume water flow from the shower stream must be redirected, or partially blocked, in order to create a complete fog free surface on the front side of the mirror. In most cases, water is diverted away from the shower stream and not returned, resulting in a loss of shower water pressure and a diminished volume of water delivered to the user. Additional coatings which are often required to stop the erosion of the back of the mirrored surface can significantly inhibit heat transfer and increase time for the mirror to clear.

The third type of fog resistant mirrors designed to be used in the shower are those which are heated from the rear via conduction by stationary warm water reservoirs.

(Condensate-Free Grooming Mirror U.S. Pat. No. 4,655,559 to Odell, Apr. 7, 1987)

(Non-Fogging Shower Mirror U.S. Pat. No. 4,832,475 to Daniels, May 23, 1989)

(Portable Condensation-Free Shower Mirror U.S. Pat. No. 5,416,635 to Christianson, May 16, 1995)

Although stationary reservoir type mirrors provide a uniformly clear fog resistant surface, they are inherently bulky in nature and expensive to produce. The reservoirs must be filled with warm water each time they are used. The warm water reservoirs are relatively heavy and require a more robust attachment mechanism to suspend them from the wall of the shower. This system is also much more expensive and complicated than the system being described in this patent application.

OBJECTS AND ADVANTAGES

Accordingly, several objects and advantages of the invention are to provide a latent heat actuated condensation-free shower mirror which can be very quickly heated in the shower stream via both the front and back sides, which will reach the shower stream temperature in a only a few seconds, which can easily be returned to an insulating retainer arm, which will automatically position the mirror substrate for optimum latent heat retention, which will remain condensation free for an extended period of time, which can be positioned for optimum convenience, which can be very easily mounted or removed from any smooth surface, which is extremely compact and portable, which is distortion free and extremely high in clarity, which provides a mirror surface that is kept clean and free from residue through normal use, which is shatterproof and durable, which is very dependable and easy to use, which is extremely light weight and excellent for traveling, which is inexpensive to manufacture, which utilizes convenient non-attached razor/tooth brush holder so as not to impede usage of the mirror and to provide further flexibility in location of shower mirror.

Other object and advantages of the invention are to provide a latent heat actuated condensation-free shower mirror, which does not require the mirror to be positioned in front of the shower stream for and extended period of time, which does not require the shower stream to be obstructed and cause inconvenience to the user, which does not require coatings on the mirror back to deter erosion of the reflective surface, which does not require expensive or complicated mirror positioning apparatus, which eliminates the need for hot water circulation systems and modifications to shower plumbing, which does not require expensive internal plumbing and/or valves which complicate operation, which does not require water to be diverted from the shower, which provides much greater portability, which provides much greater flexibility in placement of the mirror in the shower, which eliminates the need to adjust valves or fill reservoirs, which eliminates the need for a stationary reservoirs or bladders as a source of heat, which provides great reductions in size and allows for a much less complicated attachment system, which eliminates problems with leakage or spillage of the heating water which eliminates the need for fog-resistant coatings, which does not promote image distortion, which does not attract dust or soap deposits and does not require frequent cleaning, which is not limited in effectiveness by coatings which wear off or are removed by cleaning. Further objects and advantages of the invention will be apparent from a consideration of the drawings and ensuing description.

BRIEF DESCRIPTION OF THE DRAWING FIGURES

FIG. 1 Is a perspective view of the latent heat activated shower mirror with insulating and positioning retainer arm and suction mount attachment.

FIG. 2 Is an expanded side view of the self locating, anti swing mirror retainer and mirror retention hole.

FIG. 3 Is a perspective view of the razor retainer clip and suction cup.

DRAWING REFERENCE NUMERALS

10. Transparent Acrylic Sheet
11. Reflective Backing
12. Mirror Rounded Corners
13. Mirror Retention Hole
14. Tapered Mounting Tang
15. Auto Location Walls
16. Anti Swing Plane
17. Insulating Mirror Retainer Arm
18. Mirror Retainer Pivot Shaft
19. Mirror Retainer Easy Insertion Head
20. PVC Suction Cup
21. Side Hole Suction Cup Boss
22. Suction Release Tab
23. Razor Retainer Self Opening Clip
24. Razor Retainer Flexible Extension Arm
25. Razor Retainer Pivot Shaft
26. Razor Retainer Easy Insertion Head

SUMMARY OF THE INVENTION

The latent heat actuated shower mirror includes a high clarity, shatterproof, polymer mirror without backings or other attachments that can limit heat absorption. The mirror is easily removed from the insulating retention arm to allow for heating from both the front and back sides of the mirror in the shower stream. Heating the mirror from both the front and back sides permits maximum thermal energy transfer to the mirror in the shortest time possible through conduction. The design takes advantage of the warm shower stream, an excellent conductive source of thermal energy, to thermally charge the mirror. Since conductivity, the most efficient means of heat transfer, is utilized to heat from both the front and back sides of the mirror, the process takes only a few seconds. The heated polymer mirror is then returned to the insulating retention arm which minimizes conductive heat loss while positioning the mirror accurately away from the wall. This positioning takes advantage of warmer air currents to help to minimize cooling of the shower mirror. Mirror heat loss is limited almost solely to radiant heat transfer to the shower wall, the most inefficient form of heat transfer. Therefore, the mirror temperature remains above the shower dew point, prohibiting fogging for an extended period of time. Thus allowing the user to shave, remove makeup, etc. in the beneficial environment created by the warmth and humidity of the shower.

DESCRIPTION OF INVENTION

In accordance with a preferred embodiment of the invention as shown in FIG. 1, a latent heat actuated fog free shower mirror consists of a rectangular (4×5 inches) transparent acrylic sheet 10 with a silvered backing 11 and rounded corners 12. The thickness of the mirror in this embodiment is 0.080 inches. The thickness of the mirror substrate can range from 0.040" to 0.250". The thermal conductivity of the substrate can range from 0.10 to 3.5 BTUin/hrft^2F. A mounting hole 13 having a diameter of 0.250 inches is included 0.125 inches below the top of the mirror in the center. The mirror is supported by an insulating retainer arm 17 made from injection molded thermoplastic. At the front of the retainer arm is a tapered mounting tang 14 with a rounded tip to ease mirror removal and replacement. At the intersection of the mirror and retainer arm, angled locating walls 15 and a non-pivot plane 16 are incorporated into the mirror retainer arm. The retainer arm then angles up to the retainer pivot shaft 18 which rotates inside of the side hole suction cup boss 21. At the top of the retainer arm is an easy insertion head 19 having a diameter greater than the pivot shaft and the side hole. The mirror and retainer arm are supported by a PVC suction cup 20. At the edge of the side hole suction cup is a suction release tab 22.

FIG. 2 shows an expanded view of the front of retainer arm 17 and mirror mounting hole 13. The tapered mounting tang 14 can be seen in this view. Also visible an this view are auto location walls 15 and anti-swing plane 16.

FIG. 3 shows the polypropylene razor retainer and PVC suction cup. The razor retainer self opening clip 23 has a thickness of 0.060 inches and is supported by a flexible extension arm 24. The razor retainer pivot shaft 25 allows for rotational position adjustment and extends through side hole suction cup boss 21. The razor retainer self opening clip is also designed with an easy insertion head 26 to facilitate assembly with the suction cup while providing adequate pull-out force to support a razor, toothbrush, or the like.

INSTALLATION AND OPERATION

When not in use the mirror retainer 17 and razor retainer 24 are mounted on the mirror 10. In order to use the latent heat actuated shower mirror the mirror retainer 17 and razor retainer 24 are removed from the mirror 10 by pulling the suction release tab 22. The mirror 10 can then be attached to the retainer arm 17 and the resulting unit can be positioned where desired to provide optimum viewing convenience in the shower for shaving, removing makeup, facial cleansing, etc. When the desired mirror position is located on a smooth surface the suction cup 20 is simply pressed into place. This simple mounting process provides complete portability as well as a permanent mounting in your home if desired. After mounting the retainer suction cup 20 and mirror 10 to the shower wall, the razor retainer self opening clip 23 can be positioned and pressed into place in the same manner. A razor or toothbrush can then be pushed into the retainer clip 23 by simply pushing between the two spring tangs at the base of self opening clip 23. The opposing spring tangs of self opening clip 23 will elastically deform to accept the razor or tooth brush. This elastic deformation of self opening spring clip 23 is greatly enhanced by utilizing polypropylene which has a fairly high elongation versus many other thermoplastic materials. Polypropylene also provides the benefit of increased chemical resistance to shaving cream and toothpaste as well as enhanced ultraviolet resistance and low cost. Clear polypropylene provides an unobtrusive appearance and matches the clear PVC suction cup 20. After the components are positioned and attached to the wall one can shower as usual until the latent heat actuated shower mirror is needed for shaving, removing makeup, facial cleansing, etc.

When the mirror 10 is needed, the user simply lifts the shatterproof mirror 10 from the retainer arm 17, heats the mirror in the shower stream for 1 to 3 seconds on each side to bring the temperature of the mirror up to the shower water temperature (approximately 105 to 115 F). The mirror 10 is designed to accommodate extremely efficient heating from both front and back sides in the shower stream. After being heated for a few seconds, and replaced on the insulating mirror retainer arm 17, the mirror 10 will stay clear for an extended period of time (approximately 5 to 15 minutes depending upon the temperature of the shower) while shaving or facial cleansing is completed. The tapered mounting tang 14 eases replacement of the mirror by reducing the accuracy of placement required to mount the mirror while guiding the mirror onto retainer arm 17. Once past mounting tang 14, the mirror is automatically guided into exact position by the auto location walls 15 to rest on the anti swing plane 16 at the base of mirror retainer arm 17. The auto location walls 15 positively locate and retain the mirror at a fixed distance from the shower wall. The fixed distance is generally spaced from between 0.250 to 3.0 inches away from the shower wall. The anti swing plane 16 stops the mirror from swinging and aligns the plane of the mirror to be parallel to the shower wall or other mounting surface. This mirror positioning eliminates conductive heat loss by prohibiting contact with any other body or surface while providing only two small lines of contact with the mirror to further reduce conductive heat loss. The mirror positioning also allows warm circulating air (approx. 80° F.) in the shower to move past the mirror to reduce the effect of radiant heat loss to the shower wall (approx. 72° F.). These unique design factors combined with the relatively low thermal conductivity of the plastic mirror helps to retain heat to and result in a fog free surface.

Once the mirror has been heated for a few seconds and replaced on the insulating mirror retainer, it can be used to remove makeup, clean face, or to apply shaving cream. After shaving cream is applied, hands can be easily rinsed in the shower stream. By exerting a very slight pull on the razor handle, the tangs of the self opening clip 23 spread apart to allow the razor to be removed for use. The user can then use the razor and latent heat actuated fog free shower mirror to attain an extremely close, smooth, comfortable shave in less time than it takes to shave over a sink. This normal process of use also keeps the mirror surface clean and free from soap residue and mineral deposits. Both the mirror and razor retainers can be pivoted to any angle desired for convenience of use due to the mirror retainer pivot shaft 18 and razor retainer pivot shaft 25. If the set is being used for travel or it is desired to be removed, the suction release tab 20 is pulled and the unit comes freely away from the wall. The razor retainer and mirror retainer can be mounted to the surface of the mirror for storage. Due to its extremely compact size the set can easily be packed into the average travel kit for storage or transportation. The shower mirror can be very quickly and conveniently set up in a hotel shower, at the gym, or spa making it perfect for travel or home use. The mirror retainer, razor retainer, and mirror are very durable and scratch resistant therefore will not be damaged in normal traveling even when luggage is checked.

SUMMARY, RAMIFACATIONS, AND SCOPE

Accordingly, the reader will see that I have provided a latent heat actuated condensation free shower mirror. The mirror is designed to provide extremely efficient heating from both the front and back sides in the shower stream. This latent heat actuated mirror provides a fully condensation free mirror almost instantly which remains condensation free and clear for an extended period of time. After being heated for only a few (approximately 4 to 8) seconds, and replaced on the insulating mirror retainer arm 17, the mirror 10 will stay clear for an extended period of time while shaving or facial cleansing is completed. This heat optimizing design provides a much more dependable, simple to use, efficient, and affordable means to achieve a fog free mirror in the shower environment than any prior art. Installation of this mirror takes only a few seconds. The ease of installation, combined with its compact size, light weight, and durability makes this mirror extremely portable and excellent for travel as well as home use. The latent heat shower mirror is also much lighter and less expensive to manufacture than mirrors which incorporate non fogging coatings, circulating water, water reservoirs, or mirrors which require expensive mounting brackets or are otherwise positioned in the shower stream. The latent heat actuated shower mirror provides many improvements in functionality at a fraction of the cost to manufacture. The razor retainer clip significantly contributes to the convenience of utilizing the latent heat actuated shower mirror when shaving. The razor retainer can also provide the opportunity to locate your razor near the mirror, or away from the mirror if desired, for increased user convenience.

Although the above descriptions are specific, they should not be considered as the limitations on the scope of the invention, but only as an example of the preferred embodiment. Many other variations and ramifications are possible within the teachings of the invention. For example the insulating mirror retainer arm 17 and/or razor retainer could be mounted with an adhesive or insulating foam. The mirror could be made from several different plastic materials including: polycarbonate, clear ABS, clear polypropylene, or clear polyethylene. All of these materials have thermal conductivity values between approximately 0.290 and 3.530 BTUin/hrft^2F. For this reason, any of these materials, or others, could also possibly be used for the insulating mirror retainer arm 17. The mirror could have a different shape, size, or thickness than the preferred thickness 0.080 inches. A unique mirror backing material which would deter radiant heat loss or heat loss due to convection, such as aluminum foil or the like, while not significantly reducing conductive heat gain from the shower stream could be implemented. Many design variations of the mirror retainer arm are possible. It is possible to use hook and loop fasteners, clips, or other means to achieve a detachable mounting system between the mirror substrate and retainer arm. Although it would not be necessary, and may result in decreased image clarity, the an anti-fog coating or soapy water could be applied to the front surface. Many different types of razor retainers could be used in conjunction with a latent heat actuated shower mirror or the razor retainer could be omitted. Therefore the reader is requested to determine the scope of the invention by the appended claims and their legal equivalents, and not by the examples given.

I claim:

1. A latent heat actuated shower mirror assembly comprising:

a mirror having a reflective surface and a substrate;

a pivotable mirror retainer arm supporting said mirror;

said substrate having thermally exposed front and rear surfaces separated by a thickness of between generally 0.040 and 0.250 inches;

said mirror retainer arm being received by a wall retainer enabling said mirror to be rotatably positioned and mounted or removed from a surface in a shower;

said mirror retainer arm positioning said mirror away from a shower wall;

said thermally exposed surfaces are capable of being raised to a shower temperature and capable of retaining latent heat from the shower temperature thereby preventing condensation from accumulating upon said reflective surface; and wherein said substrate includes an aperture for receiving said retainer arm and said retainer arm includes a proximal end having a tapered mounting tang to ease mounting and removal of said mirror.

2. The mirror assembly of claim 1, wherein said substrate includes a thermal conductivity ranging between generally 0.100 and 3.5 BTUin/hrft^2f.

3. The mirror assembly of claim 1, wherein said substrate is formed from a high clarity plastic material.

4. The mirror assembly of claim 1 wherein said substrate includes a thickness of generally 0.080 inches.

5. The mirror assembly of claim 1, wherein said proximal end of said retainer arm includes auto location walls positioning said mirror away from the shower wall.

6. The mirror assembly of claim 1, wherein auto location walls position said mirror away from the shower wall from generally 0.250 inches to 3.0 inches.

7. The mirror assembly of claim 6, wherein said retainer arm includes an anti-swing plane positioned between said auto location walls orienting said mirror generally parallel to said shower wall.

8. The mirror assembly of claim 1, wherein said wall retainer comprises a suction cup.

9. The mirror assembly of claim 1, wherein said retainer arm includes a wall retainer end and a pivot shaft, said wall retainer end having a diameter greater than said pivot shaft.

10. The mirror assembly of claim 9, wherein said wall retainer end is received by a side hole in a suction cup boss and said wall retainer end includes a diameter greater than a diameter of said side hole.

11. A method for obtaining a condensation free mirror surface in a shower through utilization of a latent heat actuated shower mirror comprising:

(a) providing a latent heat actuated shower mirror assembly having a mirror substrate suspended from a mirror retainer arm;

(b) removing said mirror substrate from said mirror retainer arm while showering;

(c) holding said mirror assembly in a hot shower stream allowing the hot shower stream to spray upon a front surface of said mirror substrate thereby transferring thermal energy from the hot shower stream to said mirror substrate through said front surface;

(d) reorienting said mirror substrate in the hot shower stream thereby allowing the hot shower stream to spray upon a rear surface of said mirror substrate transferring thermal energy to said substrate through said rear surface; and (e) returning the mirror substrate to said mirror retainer arm configured to position said mirror substrate away from a shower wall thereby reducing heat loss from said substrate through said shower wall and allowing warm air currents derived from the shower stream to contact said rear surface of said substrate, wherein said warm air currents reduce heat loss from said mirror substrate.

12. A method as set forth in claim 11, wherein said mirror retainer arm is further defined by spacing said mirror substrate away from the shower wall from generally 0.250 inches to generally 3.0 inches.

13. A method as set forth in claim 11, further including the step of repeating steps a through e when said front surface begins to fog.

* * * * *